United States Patent [19]

Murphy

[11] 4,157,417

[45] Jun. 5, 1979

[54] SOLAR CONTROL PRODUCTS

[75] Inventor: Charles H. Murphy, South Pasadena, Fla.

[73] Assignee: ITD Industries Inc., St. Petersburg, Fla.

[21] Appl. No.: 933,993

[22] Filed: Aug. 16, 1978

Related U.S. Application Data

[63] Continuation-in-part of Ser. No. 713,863, Aug. 12, 1976, abandoned.

[51] Int. Cl.² ........................ B32B 15/08; B32B 17/10
[52] U.S. Cl. .................................... 428/344; 428/350; 428/429; 428/447; 428/411; 428/426; 428/446; 428/458; 428/461; 428/463; 428/520; 428/522; 526/15; 526/29; 526/54
[58] Field of Search ............... 428/344, 350, 426, 429, 428/411, 446, 447, 458, 461, 463, 520, 522; 526/15, 29, 54

[56] References Cited

U.S. PATENT DOCUMENTS

| | | | |
|---|---|---|---|
| 2,997,464 | 8/1961 | Sellers | 526/15 |
| 3,082,183 | 3/1963 | Boyd | 260/827 |
| 3,249,412 | 5/1966 | Kolek | 260/827 |
| 3,290,203 | 12/1966 | Antonson | 428/458 |
| 3,334,008 | 8/1967 | Park | 428/429 |
| 3,530,101 | 9/1970 | Haynes | 526/15 |
| 3,660,339 | 5/1972 | Schuh | 526/15 |
| 3,775,226 | 11/1973 | Wildorf | 428/458 |
| 4,066,820 | 1/1978 | Kelly | 428/520 |

*Primary Examiner*—Ellis Robinson
*Attorney, Agent, or Firm*—Wallenstein, Spangenberg, Hattis & Strampel

[57] ABSTRACT

Transparent-reflective metallized solar control compositions and films for application to window glass to reduce heat, glare, etc., of solar radiation.

15 Claims, No Drawings

SOLAR CONTROL PRODUCTS

This application is a continuation-in-part of application Ser. No. 713,863, filed Aug. 12, 1976 now abandoned.

The present invention relates to new and useful solar control compositions, particularly for use in the form of films for application and adherence to glass windows through an aqueous activatable non-pressure sensitive adhesive composition.

Solar control products, notably films for application and adherence to window glass and related transparent surfaces, are, broadly speaking, known to the art and are disclosed in such U.S. Pat. Nos. as 3,290,203; 3,775,226 and 3,776,805. Such heretofore known products, while possessing utility for the purposes intended, have one or more disadvantages in relation to the solar control films of the present invention as, for instance, the extent of their water resistance, their optical properties, metal surface breakdown or demetallization, and problems in relation to ease of manufacture.

In accordance with the present invention, the initial step in the production of the solar control films of the present invention, as in heretofore known procedures, is to deposit, on a thin, flexible transparent polymeric backing sheet or film, a thin layer of a metal. The backing sheet or film is most desirably an optical grade transparent polyester, so-called biaxially oriented polyethylene terephthalate film, exemplified by "CELANAR" polyester film, 5000 series (Celanese Plastics Company). The thickness of the backing film which can be used is variable but, generally, may range from about 0.5 to about 2 mils, or from about 12 to about 24 microns, with a good average being about 1 mil although film thickness is a matter of practicality, not criticality.

The metal which is deposited or coated on one side of the backing film is especially desirably aluminum, which is conveniently vacuum or vapor deposited in a substantially uniform layer of a thinness so as not unduly to reduce the transparency of the backing film. Thus, for instance, the thickness of the aluminum metal layer can be of the order of about 10 to about 120 angstroms, preferably about 30 to about 40 angstroms; or, stated otherwise, the thickness of the metal layer may be such as reduces the light transmission in the visible spectrum of the metal-layered backing film, in relation to the backing film itself, by not more than about 50 to 90% and, more desirably, by not more than about 10 to 20%. While, as stated, aluminum is especially satisfactory, other metals can be used which may be coated or deposited on the backing film by vapor deposition or other known procedures, in thickness of the same general order as indicated above, illustrative of such other metals being zinc, copper, silver and gold.

Further, in the carrying out of the present invention, there is applied to the exposed surface of the metal layer a thin coating of a liquid adhesive which advantageously contains one or more ultraviolet absorbers, for instance, of the character disclosed hereafter. The adhesive may have different compositions, but those shown in U.S. Pat. No. 2,892,747 are especially desirable. The adhesive, which advantageously has a polyester base, is laid down in a substantially uniform very thin film, sufficient to form a strong bonding medium, there being nothing critical about the exact thickness of said adhesive film. Advantageously, although such may be omitted, there is then laminated to the foregoing assembly, through the medium of said adhesive, and applied under pressure, a thin, weatherable, transparent, preferably dyed, optical grade polyester (polyethylene terephthalate) film which, advantageously, also contains one or more ultraviolet absorbers. Such films are per se known to the art and are sold under such trade designations as dyed/weatherized polyester film. (H.C.A. Martin Company). The thickness of such latter film is, again, not critical, but, as a practical proposition, is of the approximate order of 0.0003 to 0.0007 inches, generally about 0.0005 inches. As will be noted later, the final top coating containing the specified ingredients (1), (2), (3) and (4) can be applied directly to the top of the metal surface although this represents a less preferred procedure.

Instead of proceeding in the manner described above, up to this stage of the production of the solar control sheet material, it has been discovered that it is especially advantageous to apply to the system an additional substrate in the form of a thin coating or layer of an acrylic or methacrylic copolymer or an ester of acrylic acid or methacrylic acid as, for instance, a copolymer formed from an ethyl acrylate, methyl acrylate and methacrylamide, particularly a copolymer having monomeric units in the proportion 45%, 50% and 5% by weight respectively which has been cross-linked with an alkoxylated melamine formaldehyde condensation product. Many embodiments of the aforesaid additional substrate layer can be used in the practice of the present invention, and they are disclosed, for instance, in U.S. Pat. No. 4,066,820 the disclosures with respect to which patent, in the regard stated, are incorporated herein by reference. Of particular utility for the purposes of the present invention, the said substrate layer is (1) a copolymer formed from ethyl acrylate, methyl methacrylate and methacrylamide, or (2) a copolyester as see, for instance, Examples 1, 2 and 3 of said patent.

Particular of the aforesaid substrate layers, as disclosed in said U.S. Pat. No. 4,066,820, are applied in thin layers, for instance, of the approximate order of 0.002 to 0.0008 inches, generally about 0.0005 inches, and is applied directly upon the aforementioned adhesive film; or, where said adhesive film is laminated to a thin, weatherable transparent, preferably dyed, optical grade polyester (polyethylene terephthalate) film, as described above, an illustrative substrate layer disclosed in said U.S. Pat. No. 4,066,820 is applied to cover said laminating polyester film.

The advantages which are achieved in the practice of that phase of the present invention where the substrates described above, which are shown in said U.S. Pat. No. 4,066,820 are utilized reside, generally speaking, in improved optical properties, greater sheet-uniformity and reduction in cost of production of the improved solar control sheet materials.

Finally there is applied to said last-mentioned layer or film, or if said film is omitted, directly to the metallized surface, a thin coating of a composition which includes the following ingredients:

(1) An alkyl monoester of poly (methyl vinyl ether/maleic acid) resin. These resins are per se known and are sold commercially under the designation GANTREZ ES monoester resins (GAF Corporation), and are characterized by the structure

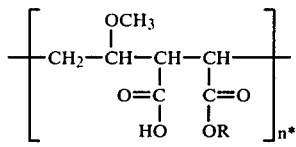

*n sp = 0.1-0.5, specific viscosity, determined on a solution of 1g resin/100 ml methyl ethyl ketone at 25° C.

where R is a $C_2$-$C_8$ alkyl radical, such as ethyl, propyl, isopropyl, butyl, isobutyl, amyl, isoamyl, hexyl, isohexyl, octyl, isooctyl, and 2-ethylhexyl. Particularly satisfactory for use in the practice of the present invention are those of said monoesters having from 4 to 8 carbon atoms in the R alkyl radical, the butyl ester sold under the designation "GANTREZ ES-435" being especially desirable and, as marketed, being in the form of a clear viscous liquid containing 50±2% solids, being soluble in isopropanol, having an acid number (100% solids) of 245–275, and a specific gravity of about 0.96. Mixtures of said monoesters can, of course, be used.

(2) Beta-3,4(epoxycyclohexyl) ethyltrimethoxysilane or Gamma-glycidoxypropyltrimethoxysilane, said silanes being sold commercially under the trade designations UNION CARBIDE A-186 and A-187 (Union Carbide Corporation). Mixtures of these silanes can, of course, be used. The silanes appear, among other things, to inhibit demetalization although, thus far, this has not been entirely fully established.

(3) The tertiary acetylenic alcohol 2,4,7,9-tetramethyl-5-decyn-4,7-diol having the formula

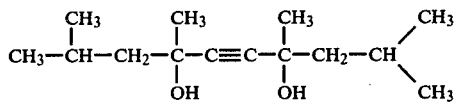

which, in the form of a white waxy solid, is sold under the trade designation SURFYNOL 104 (Air Products and Chemicals, Inc.).

(4) A polyoxyethylene aryl ether, specifically, 4 dendro phenol, which is an adduct of 1 mole of phenol with substantially 4 moles of ethylene oxide.

Optionally, but particularly desirably included in the coating compositions, are ultraviolet absorbers, illustrative of which are those sold under the trade designation UNIVAL (GAF Corporation), illustrative examples of which are 2,2'-dihydroxy-4,4'-dimethoxy-benzophenone (UNIVUL D-49); 2,2',4,4'-tetrahydroxybenzophenone UNIVUL D-50); 2,4-dihydroxy-benzophenone (UNIVUL 400); and UNIVUL 490 which is a mixture of UNIVUL D-49 and other tetra-substituted benzophenons. The wavelength transmission characteristics of these and other ultraviolet absorbers are per se known to the art and those may be selected for obtaining absorption of any particular wavelengths of ultraviolet light desired. Those which are employed should, of course, be selected so that they do not unduly adversely affect the transparency of the finished metallized, coated film. These, as well as other ultraviolet absorbers, are desirably employed also in the adhesive and the dyed polyester film referred to above.

The foregoing ingredients are made up in the form of a coating solution in suitable organic solvents, as hereafter indicated, and applied, as above noted, in the form of a thin coating over the polyester laminate film and then the coating is dried by evaporating off the organic solvent or solvents of the coating composition. The thickness of the coating, measured in the dry state, is again, somewhat variable but, generally speaking, it will lie in the range of about 0.00018 to about 0.00022 inches, most desirably about 0.0002 inches.

The following are illustrative examples of coating compositions useful in the practice of the present invention. It will be understood that other coating compositions can readily be prepared in light of the guiding principles and teachings disclosed herein. The proportions listed are in parts by weight except as is otherwise specifically stated.

EXAMPLE 1

A base formula solution is prepared by mixing together 150 parts of a 39.2% solution of GANTREZ ES-435 resin,[1] 1.25 parts of A-187, 0.25 parts of SURFYNOL 104, 1 part of UNIVUL D-50, 0.5 parts of UNIVUL 400, and 6 parts of 4 dendro phenol. The resulting base solution is admixed with a sufficient quantity of methyl ethyl ketone to produce a solution having a Zahn cup #5 viscosity of 14.

[1] The said solution is prepared by dissolving 500 parts of GANTREZ ES-435 resin in 68.4 parts of 99% isopropanol and 70 parts of methyl ethyl ketone.

EXAMPLES 2–4

|  | Ex. 2 | Ex. 3 | Ex. 4 |
| --- | --- | --- | --- |
| GANTREZ ES-435 solution[2] | 150 | 150 | 150 |
| A-187[3] (dry basis) | 1.25 | 1.25 | 1.25 |
| SURFYNOL 104[4] (dry basis) | 0.5 | 0.5 | 0.5 |
| UNIVUL D-50[5] | 1 | 1 | 1 |
| UNIVUL 400 |  | 0.5 |  |
| 4 dendro phenol[6] (active basis) | 4.5 | 6 | 3 |

[2] Solution prepared by dissolving 500 g. GANTREZ ES-435 in 87 ml isopropanol and 87 ml methyl ethyl ketone (about a 74% solution of said GANTREZ ES-435).
[3] 10% solution in equal parts of isopropanol and methyl ethyl ketone.
[4] 10% solution in equal parts of isopropanol and methyl ethyl ketone.
[5] 10% solution in equal parts of isopropanol and methyl ethyl ketone.
[6] 10% solution in equal parts of isopropanol and methyl ethyl ketone.

With respect to the aforesaid coating compositions, it will be noted that, except for the organic solvents, the GANTREX ES resins constitute the very decidedly major proportions of the coating compositions, and the remaining ingredients being all in very decidedly lesser or very distinctly minor proportions with the 4 dendro phenol constituting the largest proportion of each of said remaining ingredients. These proportions are variable within reasonable limits. However, for instance, in the above illustrative coating compositions, if the 4 dendro phenol (on the solids or active basis) is present in unduly high proportions, it causes undesirable blocking and interferes with the packaging in rolls of the finished solar control films. Thus, generally speaking, in coating formulae such are shown in Examples 2, 3 and 4, if the 4 dendro phenol (on 100 weight parts of the solids or active basis) appreciably exceeds about 6 parts, blocking becomes somewhat pronounced. In such formulae, it is desirable that the 4 dendro phenol (on 100 weight parts of the solids or active basis) constitute from about 4.5 to 6 parts of the coating compositions.

The foregoing solution of any of Examples 1–4 is substantially uniformly coated on the previously described dyed polyester film, or directly on the metallized surface if the dyed polyester film is not employed, and dried at a temperature in the range of about 125° F. to about 250° F. to drive off the organic solvent or solvents, and for a time period to produce a dry-to-thetouch surface and to leave a solvent retention in the dried coating of not more than about 2%; and of a thickness of the character set forth above. In this latter connection, the deposition of solids, from the coating solutions, should fall into the range of about 2.5 to 3 pounds per ream (3,000 sq. ft.) of filmed surface.

In applying the above-described solar control sheet material to a transparent surface such as window glass or the like, the coated surface of said sheet material is wetted with an activating solution which contains a major proportion of water and minor proportions of 4 dendro phenol, polyvinylpyrrolidone (for instance, that sold under the trade designation PVP K-30) (GAF Corporation), and a volatile nonionic surfactant, particularly suitable being 3,5-dimethyl-1-hexyn-3-ol, sold under the trade designation SURFYNOL 61 (Air Products and Chemicals). The glass surface is also wetted with water and the wetted surface of the sheet material is pressed firmly against the wet glass surface by means of a squeegee or the like which also removes excess liquid. Upon drying by allowing to stand, the solar control sheet material adheres strongly to the glass and may thereafter be washed with water or water solutions of detergents repeatedly since it exhibits excellent resistance to water. There is a marked reduction in transmission of ultraviolet rays, infrared light, and reduction in glare while retaining good transparency to visible light.

Illustrative examples of activating solutions for adhering the solar control film to glass or the like are set forth below. All parts are by volume except the PVP K-30 which is by weight.

|  | Ex. 5 | Ex. 6 | Ex. 7 | Ex. 8 | Ex. 9 |
|---|---|---|---|---|---|
| Deionized Water (ml) | 274 | 92.5 | 90 | 85 | 175 |
| 4 dendro phenol (ml) | 90 | 9 | 10 | 15 | 25 |
| PVP K-30 (g) | 40 | 4 | 4 | 4 | 8 |
| SURFYNOL 61 (ml) | 10 | 1 | 0.5 | 0.5 | 1 |

|  | Ex. 10 | Ex. 11 | Ex. 12 |
|---|---|---|---|
| Deionized Water (ml) | 100 | 100 | 100 |
| n-Propanol (ml) | 15 | 15 | 15 |
| 4 dendro phenol (ml) | 3 | 5 | 5 |
| DC 470 A (Ethylene oxide adduct of silicone glycol) | 2 | 2 | 2 |
| #258 (20% solution of GANTREZ AN 119 Resin in water (interpolymer of equimolar proportions of methyl vinyl ether and maleic anhydride, Re. Pat. No. 23,514) | 5 | 5 | 5 |
| SURFYNOL 61 | 1 |  | 1 |

In the activating solutions, the 4 dendro phenol effects solvation of the coating and inhibits formation of any undesirable precipitates. The polyvinylpyrrolidone appears to form a complex which serves, among other purposes, to facilitate the solar control film sliding over the glass surface for proper positioning of the film on the glass prior to drying. The SURFYNOL 61 functions to improve initial drying, wetting and leveling.

What is claimed is:

1. In a thin, flexible transparent solar control sheet material adapted for use as a covering for transparent glass surfaces comprising an optically clear flexible polymeric film backing having on one surface a transparent reflective metal coating, the improvement which comprises, on that side of the sheet which bears the metal coating, a thin transparent aqueous activatable adhesive film composition comprising a major proportion of (a) an alkyl monoester of poly (methyl vinyl ether maleic acid) resin, and minor proportions of (b) at least one silane selected from the group consisting of beta-3,4 (epoxycyclohexyl) ethyltrimethoxysilane and gamma-glycidoxypropyltrimethoxysilane, (c) 2,4,7,9-tetramethyl-5-decyn-4, 7-diol, and (d) 4 dendro phenol, said 4 dendro phenol being present in an effective amount but insufficient to cause blocking when said sheets are packaged in rolls.

2. The sheet material of claim 1, in which the polymeric film backing is a polyethylene terephthalate film, and the metal coating is vacuum or vapor deposited aluminum.

3. The sheet material of claim 2, wherein, laminated intermediate said metal coating and said last recited film composition, there is a thin, flexible transparent polyester film.

4. The sheet material of claim 3, in which said last-recited polyester film is a preformed dyed film.

5. The sheet material of claim 3, in which said last-recited polyester film and said transparent film composition each contains added ultraviolet absorber.

6. The sheet material of claim 2, in which the thickness of the film composition is in the range of about 0.00018 to about 0.00022 inches.

7. The sheet material of claim 6, in which the weight proportion of the (d) ingredient, based on 100 parts of the solids of the film composition, is about 4.5 to about 6 parts.

8. A coating composition for use in the production of solar control sheet materials, said coating composition comprising a major proportion of (a) an alkyl monoester of poly (methyl vinyl ether maleic acid) resin, and minor proportions of (b) at least one silane selected from the group consisting of beta-3,4 (epoxycyclohexyl) ethyltrimethoxysilane and gamma-glycidoxypropyltrimethoxysilane, (c) 2,4,7,9-tetramethyl-5-decyn-4,7-diol, and (d) 4 dendro phenol, said 4 dendro phenol being present in an effective amount but insufficient to cause blocking when said sheets are packaged in rolls.

9. The coating composition of claim 8, in which the weight proportion of the (d) ingredient, based on 100 parts of the solids of the film composition, is about 4.5 to about 6 parts.

10. A transparent glass window pane having solar controlled properties comprising a transparent glass pane to one surface of which is adhered a thin, flexible transparent solar control sheet material according to claim 1.

11. In a thin, flexible transparent solar control sheet material adapted for use as a covering for transparent glass surfaces comprising an optically clear flexible polymeric film backing having on one surface a transparent reflective metal coating, the improvement which comprises, on that side of the sheet which bears the metal coating, a thin transparent aqueous activatable adhesive film composition comprising a major proportion of (a) an alkyl monoester of poly (methyl vinyl ether maleic acid) resin, and minor proportions of (b) at least one silane selected from the group consisting of beta-3,4 (epoxycyclohexyl) ethyltrimethoxysilane and gamma-glycidoxypropyltrimethoxysilane, (c) 2,4,7,9-tetramethyl-5-decyn-4, 7-diol, and (d) 4 dendro phenol, said 4 dendro phenol being present in an effective amount but insufficient to cause blocking when said sheets are packaged in rolls, and a thin film of a substrate which comprises a copolymer of acrylic acid or methacrylic acid or an ester of acrylic acid or methacrylic acid, said latter substrate being disposed between said metal coating and said thin transparent aqueous activatable adhesive film composition.

12. The sheet material of claim 11, in which between the top of the metal surface and the film or layer of said substrate there is present a thin coating of a liquid adhesive.

13. The sheet material of claim 11, in which the film backing is a polyethylene terephthalate film, and the metal coating is vacuum or vapor deposited aluminum.

14. The sheet material of claim 13, wherein, laminated intermediate said metal coating and said transparent aqueous activatable adhesive film composition, there is a thin, flexible transparent polyester film.

15. A transparent glass window having solar controlled properties comprising a transparent glass pane to one surface of which is adhered a thin, flexible transparent solar control sheet material according to claim 11.

* * * * *